Jan. 28, 1930.  A. B. GINTER  1,745,252
MEASURING INSTRUMENT OR GAUGE
Filed Feb. 4, 1928
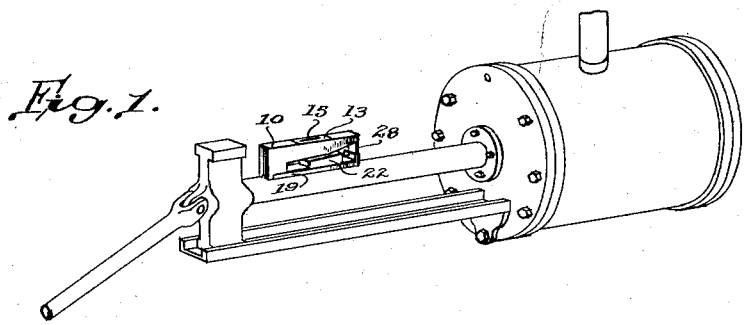
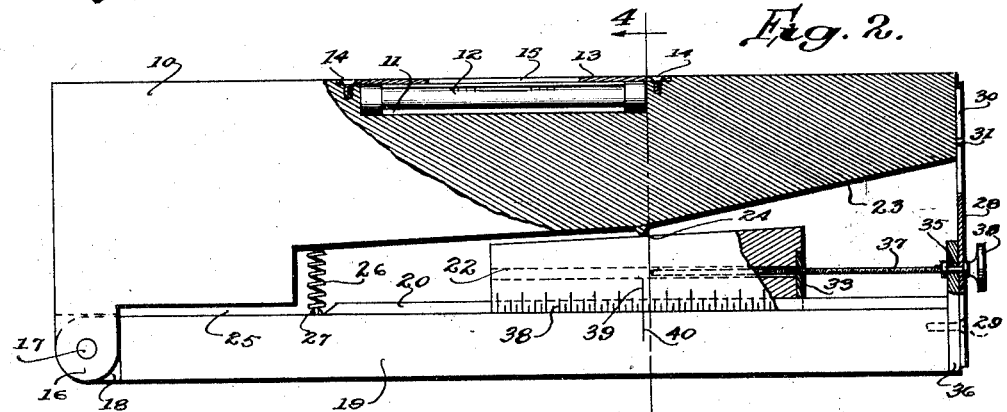
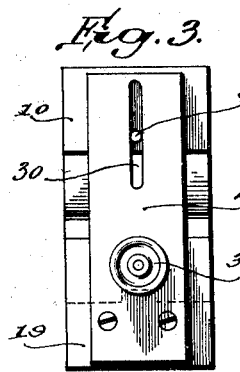
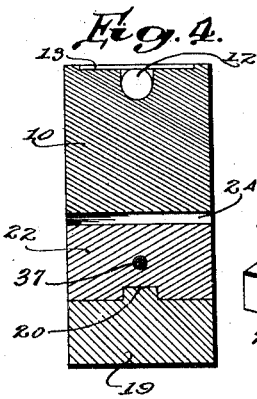
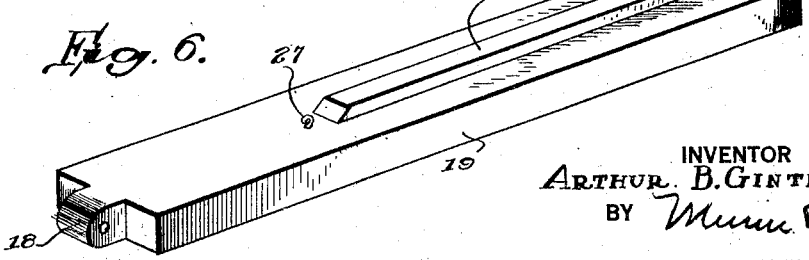
INVENTOR
ARTHUR B. GINTER
BY *Munn & Co.*
ATTORNEY Patented Jan. 28, 1930

1,745,252

UNITED STATES PATENT OFFICE

ARTHUR B. GINTER, OF NEWTON, KANSAS

MEASURING INSTRUMENT OR GAUGE

Application filed February 4, 1928. Serial No. 251,945.

This invention relates to measuring instruments or gauges generally, and more particularly to a precision type of such an instrument or gauge adapted for certain general and special uses by engineers and mechanics.

The principal object of the invention is to provide for an instrument or gauge of the class set forth, and one of a comparatively simple, inexpensive but durable and efficient construction and arrangement of parts, in the use of which shafting, piston rods and guides of locomotives, or other types of reciprocating engines, and other similar machine elements may be readily and accurately alined, and the device may be employed with equal facility for determining the slope or pitch of roofing, and the other sloping or slanting beams or timbers, heating and water supply pipe lines, etc.

With the foregoing and other equally important objects in view, the invention resides in the certain new and useful combination, construction and arrangement of parts as will be hereinafter more fully described, set forth in the appended claims, and illustrated in the accompanying drawing, in which:

Figure 1 is a perspective view of an engine cylinder piston rod, associated cross head and lower guide, and showing a practical use of the instrument, Figure 2 is a side elevation, partly in section, of a practical embodiment of the instrument, Figure 3 is an end elevation, Figure 4 is a vertical transverse section taken on the line 4—4 of Figure 2, Figure 5 is a perspective view of the adjustable member or wedge of the device, and an associated part thereof, and Figure 6 is a perspective view of the pivoted straight edge portion of the device or instrument.

Referring to the drawing, wherein similar characters of reference designate corresponding parts throughout the several views thereof, the embodiment of the invention, as shown therein, comprises a body or member 10, preferably in the form of an elongated bar of any suitable stock material, such as wood or metal, and which is recessed centrally of its upper face to receive a conventional form of spirit level glass 12. This level glass 12 and its supporting recess 11 are disposed in the longitudinal center of the body or member 10, and the level glass is retained in position by a removable closure plate 13, which is secured over the recess 11 by means of screws or the like 14. The closure plate 13 is slotted, as at 15, on its longitudinal center, and immediately in line with the level glass 12 to provide for a sight opening for the ready observation therethrough of the bubble in the liquid within the latter.

Formed at one end of the lower side of the member of bar 10 is a pair of spaced extensions or ears 16, which are centrally apertured to receive a pivot pin 17 passing through an alined aperture provided in an extension or lug 18 formed at the adjacent end of a second member or bar 19, which, when disposed parallel to the lower face of the member or bar 10, is co-extensive therewith, and is also, and preferably, of equal width with respect thereto. Extending along the upper face of the lower member or bar 19, on its longitudinal center and inwardly from the end thereof opposite its pivoted end 18 is a member 20 in the form of a rib or tongue, which is engaged in a channel 21 formed longitudinally of the under side of a wedge-shaped body or member 22 supported for adjustable movement along the member or bar 19. This member or wedge 22 operates in an elongated recess 23 formed in the lower side of the member or bar 10. The recess 23 is formed inwardly of the end member or bar 10, opposite to the point of pivotal connection of the lower member or bar 19 therewith, and has its upper side shaped at varying angles and at the junction of the inner and outer sloped portions thereof, a rib 24 is formed to act as a fulcrum cooperative with the upper sloped face of the wedge member 22.

As shown in Figure 2, the angle of slope of the inner portion of the upper side of the recess 23 is less acute than that of the outer portion thereof, so as to provide clearance for the member or wedge 22 in its adjusted movements along the upper face of the lower member or bar 19, and to allow for relative angular movements between the body or member 10 and the bar 19. It is to be noted that the pivot 17 supports the complemental end of the lower member or bar 19 in spaced relation with respect to the lower side of the body or member 10, so as to provide a clearance, as at 25, for the adjusted movements of the latter corresponding to the outward adjusted movements of the member or wedge 22. A spring 26 is attached at its lower end, as at 27, to the upper face of the lower member or bar 19 at the inner end of the rib or tongue 20, and at its upper end to the inner end of the upper side or wall of the elongated recess 23, and acts to tension the bars 10 and 19 toward each other, and in a manner that the wedge 22 is sustained in its engagement with the guide member or rib 20, and its upper inclined or sloped faces in contacting relation with the transverse fulcrum 24 at all times.

A guide member 28, in the form of a substantially rectangular plate is secured, as at 29, at its lower end to the end of the lower member or bar 19 opposite to the pivot connection 17 of the latter with the upper member or bar 10, and its upper end portion is disposed in sliding contact with the complemental end of the member or bar 10. The upper end portion of the guide plate 28 is vertically slotted, as at 30, for sliding engagement with a guide member or pin 31 projecting into the slot 30 from its secured position in the adjacent end of the body or member 10. Extending longitudinally through the wedge member 22 is a bore 32, and at the forward end or larger end of the former is a recess in which is secured a member or plate 33 in the center of which is formed a threaded opening 34 disposed in alinement with the bore 32. Projecting inwardly of an opening formed in the guide plate 28, and in an alined opening 35 formed in a bearing member or plate 36, is a wedge adjusting member or rod 37, which has its inner end portion projected through the aperture 34 in the plate 33 and into the bore 32. This inner end portion of the member or rod 37 is screw-threaded for engagement with the threads of the aperture 34 of the plate 33, so that when the member or rod 37 is turned, the wedge 22 will be moved along the guide or rib 20, and the members or bars 10 and 19 will be adjusted relatively to each other. The outer projected end of the member or rod 37 is provided with a finger piece 38 to facilitate the imparting to the same of desired reversed turning movements.

Formed along the lower portion of one or both of the vertical side faces of the wedge member 22 is a scale 38, which is graduated in fractions of inch units of linear measure to either side of a centrally located zero indicating mark 39. This indicating mark 39 is normally alined with a similar mark 40 formed on the upper edge portion or portions of the vertical side face or faces of the lower member or straight edge 19, in which position the latter will be in accurately disposed parallel relation to the top edge of the upper member or bar 10. As shown in Figure 2, the mark 40, on the lower member or bar 19, is disposed in the vertical plane of the fulcrum 24, so that when the indicating mark 39 on the wedge member 22 is alined with the mark 40, the vertical thickness of the wedge member 22, in the plane defined by the alined marks 39 and 40 and the fulcrum 24, acts to sustain the upper and lower members or bars 10 and 19 in the accurately disposed parallel relation as aforesaid.

In the use of the device as thus constructed and arranged, and with the wedge member 22 moved to the position that the indicating marks 39 and 40 are alined, the same may be employed after the manner of an ordinary spirit level. However, if, when the lower side of the lower member or straight edge 19 is rested on an object, and the bubble of the spirit level 12 indicates that the object is not level, by manipulating the finger piece 38 to rotate the rod 37, the wedge member 22 will be moved along the guide member or rib 20 on the upper face of the member or straight edge 19, and in a proper direction that the bubble of the spirit level 12 moves to level position medially of the opposite ends of the latter, when a reading in inches or fractions of an inch will be read on the scale 38 to one side or the other of the indication 40, which reading will be the exact distance the object is out of level.

In more particular uses of the instrument, as for alining locomotive piston rods, cross head guides, and the like, the same is to be positioned on a piston rod, or its cross head, with the wedge member 22 disposed in normal or neutral position, when the bubble of the spirit level 12 will also be in level indicating position. After the instrument is thus placed in position on the rod or cross head with the piston moved to one extreme position of travel, the latter is now moved to its other extreme position of travel, in which position the bubble should still occupy its level indicating position if the piston rod and its associated guides are accurately alined or parallel. However, if the bubble of the spirit level 12 has moved off center, the wedge member 22 will now be moved in either direction to bring the bubble back to center position, when a reading will be obtained on the scale 39 with reference to the zero mark 40, and this reading will indicate the amount that one end or the other of the guides is higher or lower, as the case may be.

In the use of the instrument in this particular instance, the principle on which the operation of the instrument is based may be stated as follows:

When considering the cylinder and guides of a locomotive, they are visualized as being in line with each other, that is, a line drawn through the longitudinal center of the cylinder will exactly parallel the guides when they are in line with the cylinder. Now, if the guides are not in line with the cylinder, the piston rod changes its position relative to the line of the cylinder, as it proceeds on its travel exactly in the same amount as the guides are out of line. Therefore, if we have a piston rod, say fifty inches in length and a stroke of fifty inches, the instrument, when placed firmly on the piston rod, will indicate the amount that the rod is deflected from a true center line with respect to the cylinder on its outward stroke, and it is to be noted that the amount of deflection at the cross head or the piston rod is exactly the amount the guide is out of line. If the bubble of the spirit level 12 is off center, when the instrument is laid on the cross head, it indicates that the piston rod is out of line, and by manipulating the finger piece 38, the wedge member 22 will be moved into proper direction to bring the bubble back to central or level indicating position, when the reading obtained from the scale on the wedge member will give the measurement of distance that the guides are out of line with the longitudinal center of the cylinder, and consequently with the true alined position of the piston. Therefore, the guide deflection can be readily determined by applying the following formula:

$$\frac{Wd}{Wl} \times \frac{Rl}{Ll} \times \frac{Gl}{Pt} \times \frac{Wt}{l} = \text{guide deflection, when}$$

$Wd$ equals the wedge draw; $Wl$ equals the wedge length; $Rl$ equals rod or object length; $Ll$ equals the instrument length; $Gl$ equals the guide length; $Pt$ equals the piston travel; $Wt$ equals wedge travel; and $l$ equals a constant. As an example of the application of this formula for the testing of the trueness of alinement of the piston and guides of a locomotive, all that is necessary when the engine is to be moved is to note adjusted wedge deflection of the same length of the line or frame as that of the length of the rod, and calculate as the case indicates. If the frame and rod are deflected alike the engine is in line, but, for instance, if the rod is deflected up at its back end, 3/32 of an inch of wedge travel and the line or frame is indicated for a deflection downward, at its back end say 2/32 of an inch of wedge travel, it is easily determined that the rod is deflected, relatively, back end up 3/32 inches, and by adding to this the wedge travel of 2/32 inches of the downward deflection of the frame, the total deflection or wedge travel equals 5/32 inches $Wt$, the total amount that the rod is deflected up from the line or frame. Now, if the rod is sixty inches long, and the guide is fifty inches with a piston travel of forty inches, and we are using an instrument which is 8⅛ inches long, 2⅜ inches high and 1⅛ inches thick, and the wedge is 3½ inches long, 1/2 inch in vertical thickness at one and 5/8 inches in vertical thickness at the other end, then the problem, in accordance with the above stated formula, becomes $$1/8 \times 8/25 \times 60/5 \times 50/40 \times 5/32 = 3/32$$

inches that the guide is deflected, relatively high, at its back end. So, of course, if the guide is 3/32 inches high at its back end from a parallel line with the cylinder, it is only necessary to lower the back end of the guide 3/32 inches, when the guide will be parallel with the line of the cylinder, or in line. If the guide, as a whole, is too high or too low, this deflection may be readily detected by calipering from rod to guide at several points, and both ends of the guide raised or lowered as the case demands, when the engine may be said to be in line. It is to be further noted that, when the engine is moved to cause the rod to travel to its opposite position, that the sum of wedge travel must be taken of rod and line if one is up and the other down, but if both are up or both down, the difference must be taken as wedge travel, and, for example, if the frame or line shows a 3/32 inches wedge travel down, at the back end, and the rod showed 5/32 inches wedge travel down, also at the back end, then the rod would be relatively low at its back end, hence the relative low deflection of the back end would be determined, by way of example, 5/32 inches $Wt$ minus 3/32 inches $Wt$ equals 2/32 inches $Wt$, relative low deflection of the back end of the rod. To determine the thickness of liners for use with guides for locomotives and the like, using the measurements and formula, the problem becomes $$1/8 \times 8/25 \times 60/5 \times 50/40 \times (5/32 - 3/32) = 3/80$$

inches deflection or thickness of liner necessary to align piston rod travel with the engine cylinder.

A further important use of the instrument, as herein provided, is that of determining the amount of wear of a cylinder midway of piston travel on the lower side of the cylinder of an engine, and this is to be readily accomplished, after the guides are put in line by aid of the instrument as hereinbefore explained, by first noting with a straight edge the wear of the lower guide at the center of the cross travel thereon, then placing the instrument on the rod or cross head at the centers thereof and note reading, then move the piston to center of travel and again note readings and calculate by using the formula:

$$\frac{Wd}{Wl} \times \frac{Rl}{Ll} \times \frac{Wt}{l},$$

which will equal the deflection of the rod, or the amount that the piston is lower at the center of travel to which must be added the amount that the guides is lower at the center of travel of the cross head thereon, as shown by a straight edge. It is to be noted that the length of the piston rod may be determined by measuring at a point of one-half of the cross head to a point one-half the length of the cylinder. The deflection of beams, shafting rods, etc., may also be readily determined with the instrument and the amount of such deflection calculated from the last-mentioned formula, and in either of these uses, taking certain of the dimensions or measurements aforesaid in addition to considering, in the present instance, that the length of the piston rod, beam or shaft is eighty (80) inches, and the travel of the wedge of the instrument to be 3/16 inches, the problem now will be stated $1/8 \times 8/25 \times 80/5 \times 3/16 = 3/25$ inches deflectition or out of line.

From the foregoing, it is to be readily understood that the instrument is capable of a wide range of use other than as specifically exemplified herein, and that the instrument may be proportioned to adapt the same for performing alining, levelling and various other similar construction and installation operations of greater or lesser magnitude.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A measuring instrument comprising a pair of elongated members pivoted together at one end and one above the other, a spirit level mounted in the upper side of the uppermost of said members, a horizontally elongated member movable between said members to angularly adjust the same one relative to the other, and a graduated scale carried on one of the longer sides of said member and cooperative with a reference point on one of said members to indicate the angular disposition of the lower member for a particular adjustment of said movable means when the bubble of the spirit level is positioned to indicate that the upper of the members is level.

2. A measuring instrument comprising a pair of superposed elongated members pivotally connected together at one end, a spirit level mounted in the upper face of the uppermost of said members, a wedge-shaped member interposed between said members, means for adjustably moving said wedge relative to said members angularly with respect to the upper member when the bubble of the spirit level indicates the instrument to be normally out of level and to thereby dispose the upper member in accurately levelled position, and a graduated scale carried by said wedge member and cooperative with a reference point on the lower of said members to indicate the angular disposition of the lower member for a particular adjustment of said wedge member when the bubble of the spirit level is positioned to indicate that the upper of the members is level.

3. A measuring instrument comprising a pair of superposed elongated members pivotally connected together at one end, a spirit level mounted in the upper face of the uppermost of said members, a wedge-shaped member interposed between said members, means for adjustably moving said wedge relative to said members to vary the lower of said members angularly with respect to the upper member when the bubble of the spirit level indicates the instrument to be normally out of level and to thereby dispose the upper member in accurately levelled position, and an oppositely graduated scale carried by said wedge member and cooperative with a reference point on the lower of said member to indicate the angular disposition of the lower member for a particular adjustment of said wedge member when the bubble of the spirit level is positioned to indicate that the upper of the members is level.

4. A measuring instrument comprising a pair of superposed elongated members pivotally connected together at one end, a spirit level mounted in the upper face of the uppermost of said members, the upper of said members having a recess formed at its lower side and inwardly of the end thereof opposite to the pivotal connection of the same with the lower of said members, a wedge shaped member interposed between said members, means for adjustably moving said wedge relative to said members to vary the lower of said members angularly with respect to the upper member when the bubble of the spirit level indicates the instrument to be normally out of level and to thereby dispose the upper member in accurately levelled position, a fulcrum carried within the said recess and cooperative with the upper inclined side of said wedge member, and an oppositely graduated scale carried by said wedge member and cooperative with a reference point on the lower of said members to indicate the angular disposition of the lower member for a particular adjustment of said wedge member when the bubble of the spirit level is positioned to indicate that the upper of the members is level.

5. A measuring instrument comprising a pair of superposed elongated members pivotally connected together at one end, a spirit level mounted in the upper face of the uppermost of said members, the upper of said members having a recess formed at its lower side and inwardly of the end thereof opposite to the pivotal connection of the same with the lower of said members, a wedge shaped member interposed between said members, means for adjustably moving said wedge relative to said members to vary the lower of said members angularly with respect to the upper member when the bubble of the spirit level indicates the instrument to be normally out of level and to thereby dispose the upper member in accurately levelled position, a fulcrum positioned within the said recess and on the upper wall thereof, said fulcrum being cooperative with the upper inclined side of said wedge member, and an oppositely graduated scale carried by said wedge member and cooperative with a reference point on the lower of said members to indicate the angular disposition of the lower member for a particular adjustment of said wedge member when the bubble of the spirit level is positioned to indicate that the upper of the members is level.

Signed at Newton in the county of Harvey and State of Kansas this 31st day of January A. D. 1928.

ARTHUR B. GINTER.